United States Patent [19]

Jandacek

[11] 3,865,939
[45] Feb. 11, 1975

[54] EDIBLE OILS HAVING HYPOCHOLESTEROLEMIC PROPERTIES

[75] Inventor: Ronald James Jandacek, Cincinnatio, Ohio

[73] Assignee: The Procter & Gamble Company, Cincinnati, Ohio

[22] Filed: Feb. 23, 1973

[21] Appl. No.: 335,290

[52] U.S. Cl.................. 424/238, 424/239, 426/194
[51] Int. Cl.............................................. A61k 17/00
[58] Field of Search ............ 424/238, 239; 426/194

[56] References Cited
UNITED STATES PATENTS 2,693,476  11/1954  Cummings et al............... 260/397.2
3,751,569  8/1973  Erickson............................ 424/173

Primary Examiner—Shep K. Rose
Attorney, Agent, or Firm—John B. Goodman; Richard C. Witte; Jack D. Schaeffer

[57] ABSTRACT

Edible cooking and salad oil compositions having enhanced hypocholesterolemic properties comprising from about 2.0 to about 6.9 wt. % of a plant sterol; a solubilizing agent therefor such as free fatty acids, fatty acid esters, and alkanols; and a clear, liquid glyceride base oil.

7 Claims, No Drawings

EDIBLE OILS HAVING HYPOCHOLESTEROLEMIC PROPERTIES

BACKGROUND OF INVENTION

This invention relates to edible oils and foodstuffs comprising such oils. Said oils having dissolved therein a sufficient amount of a plant sterol to give significant hypocholesterolemic activity. As used herein, the term "hypocholesterolemic" means reducing the cholesterol level in the blood of warm-blooded animals or inhibiting or reducing the build up of cholesterol in the blood. The term "plant sterol" includes all non-animal sterols, that is, not only phytosterols (plant sterols characteristic of higher plants) but also mycosterols (plant sterols from lower plants). For a more complete description of plant sterols, see Deuel, Jr., Harry J., *The Lipids*, Volume 1, Interscience Publishers (New York — 1951) at pages 321 and 348. These compositions remain clear at normal home refrigerator temperatures. Moreover, the added plant sterols show resistance to precipitation from the oil in the presence of water, for example, when a vinegar and oil emulsion is prepared. Thus, the plant sterols are added to the oils in effective amounts without affecting the appearance of the oils.

The addition of hypocholesterolemic additives, including plant sterols and plant sterol esters, to oil is old. [See Wruble, et al., U.S. Pat. No. 3,085,939; Jones, U.S. Pat. No. 3,203,862; Beveridge, Canadian Pat. No. 567,202; and Peterson, et al., 50 *Journal of Nutrition* 191–210 (1953)]. Belgium Pat. No. 753,648 (Jan. 18, 1971) which corresponds to co-pending U.S. Pat. application Ser. No. 217,708 to B. A. Erickson filed July 17, 1969 now U.S. Pat. No. 3,751,569 dated Aug. 7, 1973 relates to clear cooking and salad oils having hypocholesterolemic properties. The Belgium patent teaches the enhanced solubility of plant sterol esters over the free sterol in edible oils. The above-mentioned patent to Wruble, et al., relates to a pharmaceutical composition comprising a water-oil emulsion which contains plant sterols and certain emulsifing agents among which are free fatty acids.

The problem which has beset the prior art, which is representatively depicted by the above-mentioned patents and publications, is that plant sterols characteristically have very limited solubility in any solvent system much less edible oils. But in order for edible oil compositions to exhibit hypocholesterolemic properties to a useful extent, it is necessary that the hypocholesterolemic agent (herein plant sterols) be present in true solution in the edible oil base at a level of from about 2.0 to about 6.0 wt. %. Further, it is required that oils containing plant sterols remain clear at normal home refrigerated temperatures, i.e., that the added sterol not percipitate from the oil at reduced temperatures. Also, it is required that the added sterol resist precipitation from the oil on the addition of water.

Accordingly, it is an object of this invention to provide edible oil compositions, such as, salad and cooking oils and foodstuffs comprising such oils, which remain clear at reduced temperatures and which exhibit enhanced hypocholesterolemic activity occasioned by the presence in said oils of plant sterols, at concentration levels which heretofore have not been practicable.

SUMMARY OF THE INVENTION

Briefly stated, the edible oil compositions of this invention comrpise a clear liquid glyceride base oil containing as an active hypocholesterolemic agent from about 2.0 to about 6.0 wt. % of a plant sterol, and from about 0.5 to about 15.0 weight % of a solubilizing agent for said plant sterol selected from the group consisting of fatty acids having from six to 18 carbon atoms, monoesters of said fatty acids with polyhydric alcohols and alkanols having from about six to about 18 carbon atoms.

DETAILED DESCRIPTION OF INVENTION

It is accepted in the art that an elevated cholesterol concentration in the circulating body plasmas indicates a set of metabolic abnormalities which frequently manifest an atherosclerotic condition. It is also accepted that exogenous cholesterol introduced from the gut to the circulating plasmas advances, possibly causes, atherosclerotic disease. Consequently, the art has suggested numerous therapeutic means to prevent the absorption of cholesterol from the gut. Conspicuously successful among these means is the utilization of plant sterols in dietary compositions. However, there is no unanimous agreement in the art which explains the efficacy of plant sterols in reducing the absorption of cholesterol from the gut. This lack of unanimity probably indicates that plant sterols function by more than one mechanism in the overall suppression of cholesterol absorption.

The present invention originates from focusing attention on a particular mechanism, and makes available a collection of dietary compositions which enhance this particular mechanism in the suppression of cholesterol absorption. These oil-based dietary compositions comprise an inherently non-absorbable steroid, for example, certain food grade plant sterols and a solubilizing agent for such steroids.

The mechanism which is central to this invention may be appreciated from the following comments: It is known that oil is essential for the absorption of cholesterol. Further, it is known that cholesterol is transported from an oil-solubilized form in the intestine to the mucosal cells for absorption into the lymph. The steps leading to ultimate absorption may generally be stated as follows: A cholesterol bearing oil phase is progressively dispersed as minute oil droplets in the predominately aqueous food mixture during passage from the stomach to the small intestine. Thereafter, emulsifing agent such as bile acids fatty acids, and monoglycerides thereof progressively attack the discrete oil droplets to form colloidal micelles which are presented to the mucosal cells for absorption of their lipid components. Fats and oils, however, are preferentially taken from the discrete oil droplets by the emulsifing agents. The result is that the steriod components of the oil droplets undergo a relative enhancement in concentration as micelle formation proceeds. Since steroids are so difficultly soluble, a condition of saturation is soon reached whereupon crystallization of the steroids commences. It has been established that crystalized steroids cannot again be effectively solubilized for absorption. Consequently, the crystalized steroids are excreted.

Inherently nonabsorbable steroids such as certain plant sterols and their carboxylic acid esters effectively promote the crystallization of cholesterol from the oil droplets by competing with cholesterol for occupancy in the oil droplet. The overall result is that a state of saturation with respect to cholesterol is reached thereby initiating its crystalliztion.

A problem which has beset the art is that the inherently nonabsorbable steroids are, as is cholesterol, exceeding difficult to solubilize in dietary compositions such as salad and cooking oils. Consequently, the art has not been able to fully exploit the above mechanism in suppressing the absorption of cholesterol. The present invention solves this problem by incorporating into dietary compositions certain steroid solubilizing agents such that greater concentrations of inherently nonabsorbable steroids may be incorporated into such dietary compositions.

The principal dietary compositions encompassed by this invention are cooking and salad oils. Additionally, the development fully contemplates oleaginous gel foodstuffs such as peanut butter, mayonnaise, ice cream, and margarine spreads which incorporate such oils.

The inherently nonabsorbable steroids are not necessarily restricted to the conventional plant sterols but encompass all nontoxic steroids and like compounds which compete with cholesterol for occupancy in the oil droplets, thereby promoting crystallization of ingested cholesterol so that it may be excreted without absorption. Suitable solubilizing agents for the inherently nonabsorbable steriods may be selected from nontoxic compounds such as alcohols, free fatty acids, and simple esters of such fatty acids such as monoglycerides.

The components of the edible compositions of this invention, namely: the oil base, the inherently nonabsorbable steroid, and the solubilizing agent are described in greater detail below. Also described are recommended procedures for combining the above mentioned components to yield the food compositions of this invention. And lastly there is presented a series of examples featuring the hypocholesterolemic edible oils of this invention.

THE OIL BASE

A wide variety of clear, liquid glyceride base oils can be used in the compositions of this invention. Pure triglycerides liquid at normal home refrigerator temperatures, such as triolein, are suitable. Also included among suitable oils are the so called natural salad oils such as for example olive oil, sunflower seed oil, safflower oil, and sesame seed oil. Other naturally occurring liquid glyceride oils such as cottonseed oil and corn oil are also useful; these oils are given a preliminary "winterization," dewaxing, or similar treatment to remove the higher melting stearines before being used as an oil base. Certain other oils such as soybean oil can be partially hydrogenated before use to improve their resistance to oxidative deterioration during prolonged storage periods; the higher melting solids formed during the hydrogenation treatment are preferably removed by winterization.

Suitable clear liquid glyceride base oils can also be obtained by directed, low temperature interesterification or rearrangement of animal or vegetable fatty materials, followed by removal of the higher melting solids formed during the reaction. For an example of this procedure, see U.S. Pat. No. 2,442,532. Another group of oils suitable for use as the liquid glyceride base oil is that group of oils in which one or more short-chain fatty acids, such as acetic acid, and propanoic acid, replace in part, the long chain fatty acids present in natural triglyceride oils.

Other useful clear liquid glyceride oils can be derived from animal, vegetable and marine sources, including mixtures of various of such oils. Particularly preferred oils for use in this invention are triolein cottonseed oil, soybean oil, and mixtures thereof.

THE INHERENTLY NONABSORBABLE STEROIDS

As stated above, all nontoxic steroids capable of decreasing the solubility of cholesterol in a colligative manner within the gut are encompassed by this invention. More specifically, plant sterols are encompassed by this invention. For example, suitable free plant sterols for practice for this invention are $\alpha$-sitosterol, $\beta$-sitosterol, stigmasterol, ergosterol, and campesterol. Typically the solubility of the above-mentioned free plant sterols in the abovementioned glyceride base oils is in the range from about 0.5 to 1.5 wt. %. These concentration levels are considered too low to provide a noticeable hypocholesterolemic effect. However, as will become apparent below, by means of the copresence of a suitable steroid solubilizing agent, the concentration range of the above-mentioned free plant sterol can be raised to from about 1.5 to about 6.0 wt. %. The preferred range for purposes of practicing this invention is from about 2.0 to about 6.0 wt. % of such free plant sterols in the above-described glyceride base oils.

THE STEROID SOLUBILIZING AGENT

The steroid solubilizing agents encompassed by this invention are free fatty acid, alkanols, and esterified fatty acids such as monoglycerides. Among the most preferred saturated and unsaturated fatty acids are those having from 6 to 18 carbon atoms. For a more complete description of these fatty acids, see Markley, Klare S., *Fatty Acids*, Part I, Interscience Publishers, Inc. (New York, 1960). Saturated fatty acids containing more than about 18 carbon atoms have a tendency to crystallize from an oil solution and hence are not suitable for practice of the present invention.

Examples of suitable fatty acids are oleic, steric, palmitic, and lauric.

Examples of suitable fatty acid esters are sorbityl derivatives and glycerides, such as monoolein, monolaurin, monostearin, and monopalmitin.

Table I illustrates the enhanced solubility of certain plant sterols in liquid glyceride base oils occasioned by the presence of certain steroid solubilizing agents encompassed by this invention.

TABLE I

| Steroid Component | Oil Base | Solubilizing Agent | Wt. % | Steroid Solubility Wt. % at 25°C. |
|---|---|---|---|---|
| $\beta$-Sitosterol | Triolein | Oleic Acid | 5.0 | 3.5 |
| $\beta$-Sitosterol | Triolein | Oleic Acid | 10.0 | 3.8 |
| $\beta$-Sitosterol | Triolein | Hexanoic Acid | 5.0 | 4.0 |
| $\beta$-Sitosterol | Soybean Oil | Hexanoic Acid | 10.0 | 5.0 |
| Stigmasterol | Soybean Oil | Lauric Acid | 5.0 | 3.5 |

HYPOCHOLESTEROLEMIC EDIBLE OILS, PREPARATION

No criticality exists as to the actual preparation of the composition-invention. But speaking generally, it can be said that superior results are obtained when the steroid substance is first dissolved in a solvent in which the steroid enjoys a solubility greater than that permissible in the edible oil. Examples of such solvents are hexane, diethyl ether, and ethanol. The steroid so solubilized is then added to the edible oil to which has been added a suitable steroid solubilizing agent of this invention. Thereafter, the intermediate solvent may be removed by evaporation.

In general, the concentration level of the steroid should be within the range of from about 2.0 to about 6.0 wt. %, and the corresponding concentration of the steroid solubilizing agent should preferably be within the range of from about 0.5 to about 15.0 wt. %. The edible oil compositions herein described reduce the level of cholesterol in the blood that is directly of dietary origin up to 65% compared when no hypocholesterolemic additives are utilized. The hypocholesterolemic edible oils can be utilized as such for purposes of cooking and salad dressings, or can be incorporated with other food ingredients to yield food products as diverse as mayonnaise and bread, and when utilized as an ingredient in other foods, the hypocholesterolemic activity is retained.

The following examples further illustrate the novel edible oil compositions of this invention.

EXAMPLE I

Clear cooking and salad oil compositions were prepared by dissolving a free plant sterol in a liquid triglyceride edible oil. Table II gives these compositions and shows the identity of the triglyceride, the concentration and identity of the plant sterol, and the identity and concentration of the sterol solubilizing agent. All of the compositions given in Table II remain clear at normal home refrigerator temperatures (ca. 40° F). Further, all of the compositions listed in Table II exhibit enhanced hypocholesterolemic properties.

TABLE II

| Identity of Triglyceride | Concentration and Identity of Plant Sterol | Identity and Concentration of Sterol Solubilizing Agent |
| --- | --- | --- |
| Soybean Oil | β-Sitosterol 2.5% | 5.0% Oleic Acid |
| Corn Oil | β-Sitosterol 2.5% | 5.0% Lauric Acid |

Substantially equivalent results are obtained as in Example I when the β-sitosterol is replaced by an equivalent amount of α-sitosterol, stigmasterol, egosterol, and campesterol, respectively.

Substantially equivalent results are obtained as in Example I when the steroid solubilizing agent is palmitic acid, stearic acid, monoolein, hexanol, monolaurin, monostearin, and monopalmitin, respecitvely.

What is claimed is:

1. A food composition having hypocholesterolemic activity comprising at least one edible oil in homogeneous admixture with (a) from about 2.0 to about 6.0 wt. % of a plant sterol; (b) from about 0.5 to about 15.0 wt. % of a solubilizing compound selected from the group consisting of saturated and unsaturated fatty acids having from six to 18 carbon atoms, monoesters of said fatty acids with polyhydric alcohols, and alkanols having from six to 18 carbon atoms.

2. The product of claim 1 wherein the food composition is a clear cooking and salad oil composition.

3. The cooking and salad oil composition of claim 2 wherein the plant sterol is α-sitosterol, β-sitosterol, stigmasterol, egosterol, campesterol, or mixtures thereof.

4. The cooking and salad oil composition of claim 3 wherein the base oil is selected from the group consisting of triolein, soybean oil, cottonseed oil, and mixtures thereof.

5. The food composition of claim 1 wherein the solubilizing compound is selected from the group consisting of saturated and unsaturated fatty acids having from 6 to 18 carbon atoms.

6. The food composition of claim 1 wherein the solubilizing compound is selected from the group consisting of monoesters of saturated and unsaturated fatty acids having from 6 to 18 carbon atoms.

7. The food composition of claim 1 wherein the solubilizing compound is selected from the group consisting of alkanols having from six to 18 carbon atoms.

* * * * *